United States Patent
Mahmoudi et al.

(10) Patent No.: US 7,891,612 B2
(45) Date of Patent: Feb. 22, 2011

(54) FLAP DEVICE

(76) Inventors: Amirhossein Mahmoudi, 154, 1 Kosar, Tohid Square, Tehran (CA); Firouz Alizadeh Salimi, Cote St-Luc, Cote St-Luc, Quebec (CA) H4W 2W4

( * ) Notice: Subject to any disclaimer, the term of this patent is extended or adjusted under 35 U.S.C. 154(b) by 515 days.

(21) Appl. No.: 12/117,743

(22) Filed: May 9, 2008

(65) Prior Publication Data

US 2009/0321581 A1  Dec. 31, 2009

Related U.S. Application Data

(60) Provisional application No. 60/924,348, filed on May 10, 2007.

(51) Int. Cl.
*B64C 3/50* (2006.01)
(52) U.S. Cl. .................... 244/215; 244/213
(58) Field of Classification Search ............ 244/215, 244/213, 214, 110 D, 212, 211
See application file for complete search history.

(56) References Cited

U.S. PATENT DOCUMENTS

| 1,841,804 | A | * | 1/1932 | Hall | 244/212 |
|---|---|---|---|---|---|
| 2,257,215 | A | * | 9/1941 | Zap | 244/215 |
| 3,831,885 | A | * | 8/1974 | Kasper | 244/199.1 |
| 4,566,657 | A | * | 1/1986 | Grow | 244/90 A |
| 4,881,703 | A | * | 11/1989 | Nahas | 244/213 |
| 5,566,910 | A | * | 10/1996 | Diekmann et al. | 244/216 |
| 5,895,015 | A | * | 4/1999 | Saiz | 244/215 |
| 6,565,045 | B1 | * | 5/2003 | Correge et al. | 244/215 |
| 7,740,205 | B1 | * | 6/2010 | Nahas | 244/198 |
| 2003/0102410 | A1 | * | 6/2003 | Gessler et al. | 244/215 |
| 2007/0102588 | A1 | * | 5/2007 | DuRant | 244/215 |
| 2009/0072085 | A1 | * | 3/2009 | Mason et al. | 244/99.14 |

* cited by examiner

*Primary Examiner*—Christopher P Ellis

(57) ABSTRACT

A flap device adapted for location on or in a fluid interfacing surface such as an airfoil section, the device comprising a housing, a flap mounted for rotation at least partially within the housing, an entry in a leading portion of the housing, and at least one stop member associated with the housing and actuable between a non-operative parked position and an operative position in which in use the stop member is adapted to limit the movement of the flap within the housing thereby to vary the coefficient of lift and drag of the fluid interfacing surface or airfoil section.

16 Claims, 5 Drawing Sheets

FLAP DEVICE

This application claims priority based on provisional application 60/924,348 filed May 10, 2007

FIELD OF THE INVENTION

The present invention relates generally to airplane parts but more particularly to a device intended to replace conventional flaps of the kind deployed on the wings of fixed-wing aircraft for controlling the coefficient of lift and drag of the wings. Although the invention relates primarily to a flap device used in aeronautical applications, it may also be exploited for any vehicles moving through a fluid medium, for example space vehicles or indeed nautical vessels having stabilizing fins for controlling the characteristics of trajectory or generally the movement of the vehicle or vessel by altering the geometry of the lift structure.

BACKGROUND OF THE INVENTION

Flaps are hinged surfaces on the trailing or leading edges of the wings of a fixed wing aircraft which when activated change the coefficient of lift and drag of the wing. There are many and various kinds of flaps, all of which are hinged to the airfoil section of the wing at either the trailing or leading edge thereof or indeed at both. However, they all require actuation to bring them into an operational or parked position in relation to the airfoil section. Conventionally hydraulic or electro-hydraulic systems have been used for this purpose, thus adding to the complexity and the expense of the aircraft and to its operating costs in terms of repair and maintenance. Apart from the actuation of the flaps, the design of the linkages employed to effect the desired movement is often itself complicated. For example, pivoted parallelogram frames are used and clearly the more complex the linkage design the greater is the potential for failure. Accordingly, a safety issue also arises. Accordingly, there is a need for an improved flap device obviating the disadvantages of conventional flap systems whilst providing a simpler and more effective mechanism for performing the same function.

SUMMARY OF THE INVENTION

In view of the foregoing disadvantages inherent in the known devices now present in the prior art, the present invention, which will be described subsequently in greater detail, is to provide objects and advantages which are:

To provide an improved flap device.

To provide for a flap device that incorporates a self actuating mechanism when an aircraft is in motion.

A further advantage of the present invention is that the flap device is of greater simplicity than conventional flaps thus affording a reduction in energy consumption during use and a concomitant reduction in maintenance costs.

Yet another advantage of the present invention is that the flap device is of greater reliability and thus safety than conventional flap systems.

Another advantage of the present invention is that the flap device can be used on any surface that interfaces with a fluid, it being gaseous or liquid.

According to a first aspect of the invention, there is provided a flap device adapted for location on or in a fluid interfacing surface such as an airfoil section, the device comprising a housing, a flap mounted for rotation at least partially within the housing, an entry in a leading portion of the housing, and at least one stop member associated with the housing and actuable between a non-operative parked position and an operative position in which in use the stop member is adapted to limit the movement of the flap within the housing thereby to vary the coefficient of lift and drag of the fluid interfacing surface or airfoil section.

The housing may be of essentially hemispherical form and the flap may be of circular disc-like shape being pivotally mounted on a diametrical axis whereby the movement of the flap sweeps the void within the housing. In an alternative embodiment the housing may be hemicylindrical and the flap may be rectilinear being pivotally mounted along an axis thereof, the flap sweeping the void within the housing.

The stop member, of which there may be more than one, may comprise a pin operable electro-magnetically to assume the non-operative parked position or the operative position whereby it extends into the housing to provide an arresting stop for the flap to limit its movement.

Thus in use the extension of the stop member effectively maintains the flap in an appropriate orientation for the desired purpose, namely to control the lift or drag coefficient of the airfoil section. Conveniently, two or more stop members are provided at different location about the housing, one being provided for maximum lift and the other for maximum drag for take-off and landing respectively.

Other stop members may be disposed at other locations thus affording flexibility of control of the flap, the movement of which is effected by the motion of the airfoil section through the fluid medium, i.e. air, in this example.

The flap may advantageously be mounted on a shaft carried in suitable bearings or bushings in the housing, and a damping mechanism may be provided to modulate the speed of rotation of the shaft and thus of the flap. The damping effect of this mechanism prevents any undesirable impact that may be occasioned by the flap contacting the stop member.

The damping mechanism may additionally be used to prevent rotation of the flap, on either direction, selectively, and accordingly may act as a brake. The damping mechanism may be of the rotational damper type.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION

Figure 1:
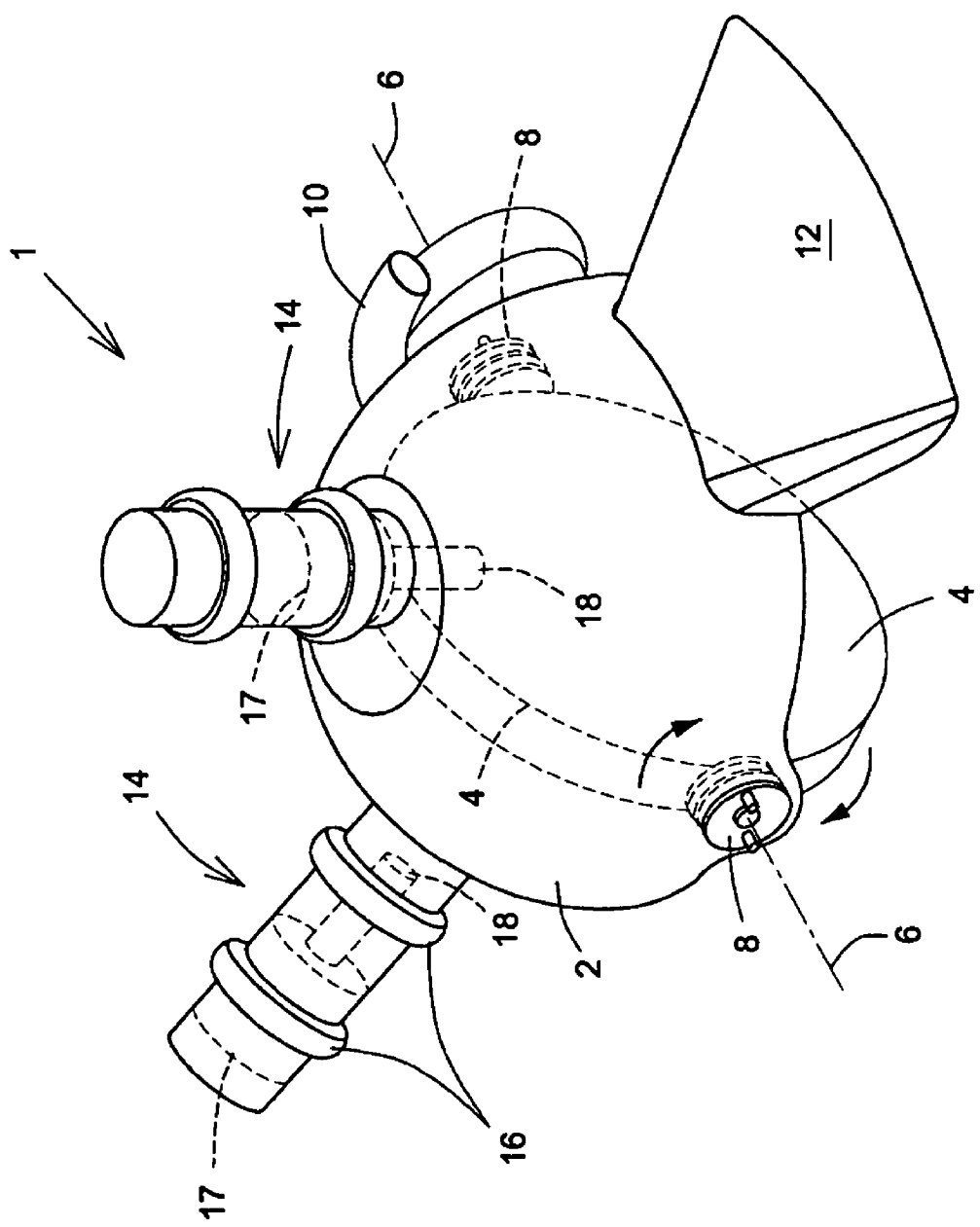
FIG. 1 Isometric external view of the flap device.

A flap device 1 comprises a housing 2 of hemispherical form with a disc-shaped flap 4 mounted on a shaft 6 thereof. The flap 4 is carried by the shaft 6, which is held in bearings 8 at each end thereof. At one end of the shaft 6 there is provided a damping mechanism 10 for a purpose hereinafter described.

Figure 2:
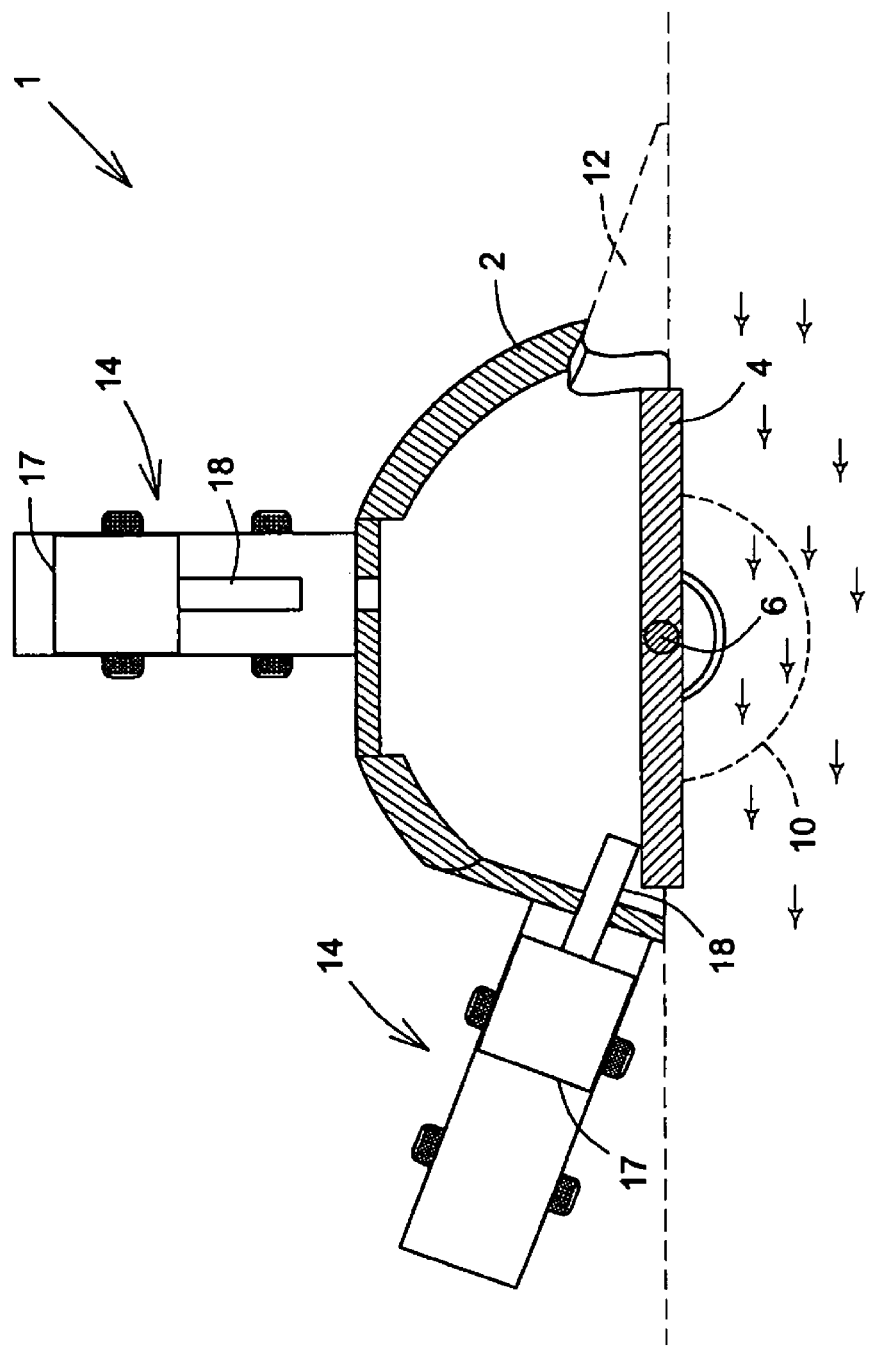
FIG. 2 Side sectional elevation of the flap device of FIG. 1 showing the flap in one operational position, typically a normal cruise flight condition.

The housing 2 is provided with a flared entry 12 leading to the void therewithin and also has mounted at a number of locations on its exterior a stop member casing 14. In this embodiment two casings 14 in full outline are illustrated for ease of illustration purposes, similarly in FIGS. 2, 4 and 5 and each casing 14 encloses a twin-coiled electro-magnet 16 providing rectilinear movement in both directions, the core 17 of each magnet 16 carrying a pin 18 constituting a stop member. The stop member casings 14 are angularly displaced one from the other exteriorly of the hemispherical housing 2 as can readily be seen in the figure, the angular disposition being selected according to the desired geometry and thus the performance characteristics to be achieved. As can be seen from FIG. 3 additional stop member casings 14 are shown in ghost outline to 10 indicate the possibility of providing multiple stop member pins 18 for multiple pre-determined angular positions.

Figure 5:
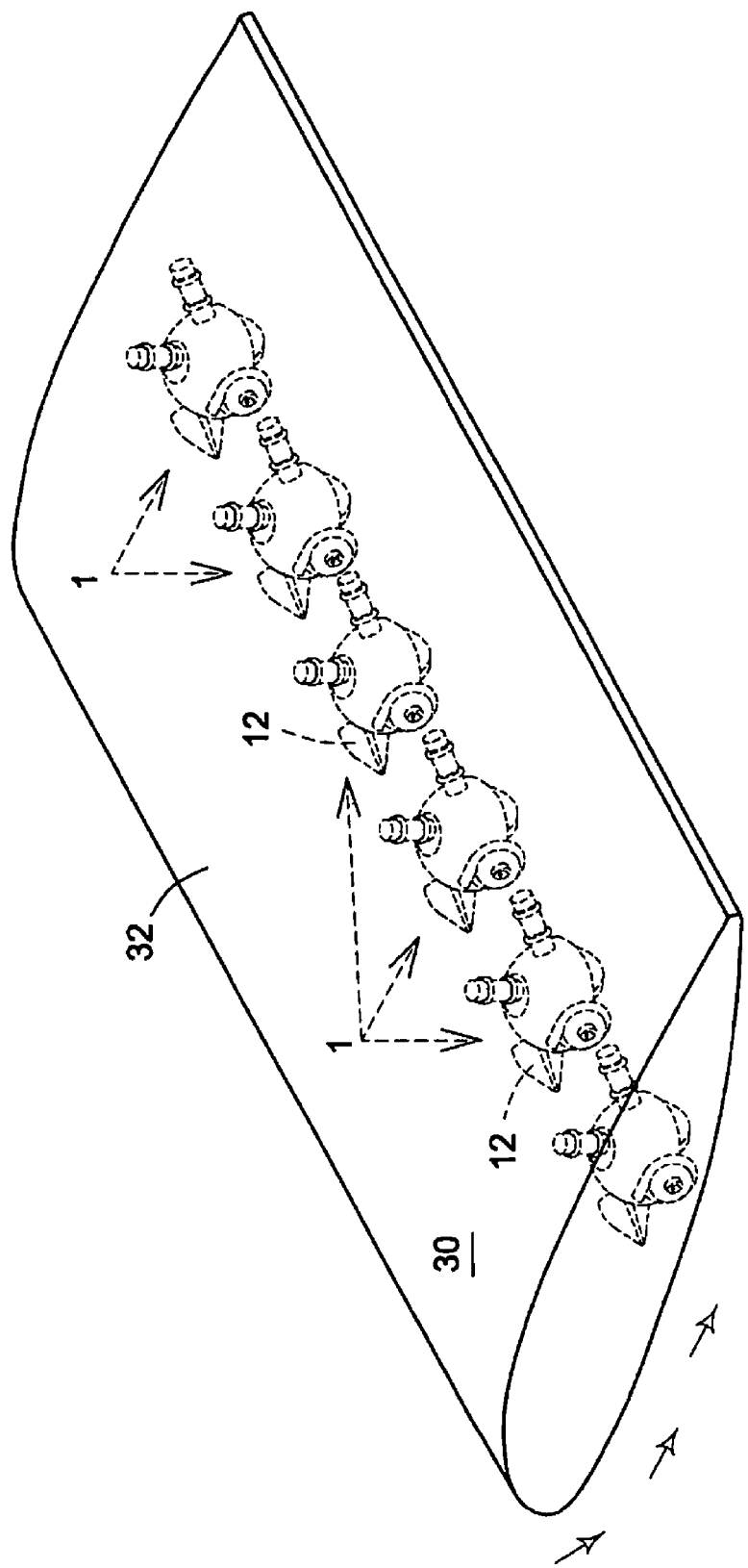
FIG. 5 Isometric view of an airfoil section depicted with a plurality of flap devices mounted thereon.

In use, a plurality of flap devices 1 would be arrayed on or in a fluid interfacing surface such as an airfoil section 30 or the like as shown in FIG. 5 with the flared entries 12 facing or in line with the leading edge 32 of the airfoil section 30. Upon movement of the aircraft not shown air flow passes under the airfoil section 30 and in so doing tilts the flap 4 about its axis 6 of rotation causing it to assume a substantially horizontal orientation seen in FIG. 2 for minimum drag with minimum impact onto the optimum wing profile, as required for nominal flight cruise condition, the flap 4 abutting a first stop member pin 18 which has been extended into the position shown by the electro-magnet 16 an additional pin, not shown, could be used to forcibly maintain the flap in that horizontal position, in order to prevent it from rotating in either direction. A suitable power source not shown, which may be provided by a 12-volt battery or the like, is used for actuating the pins 18.

Figure 3:
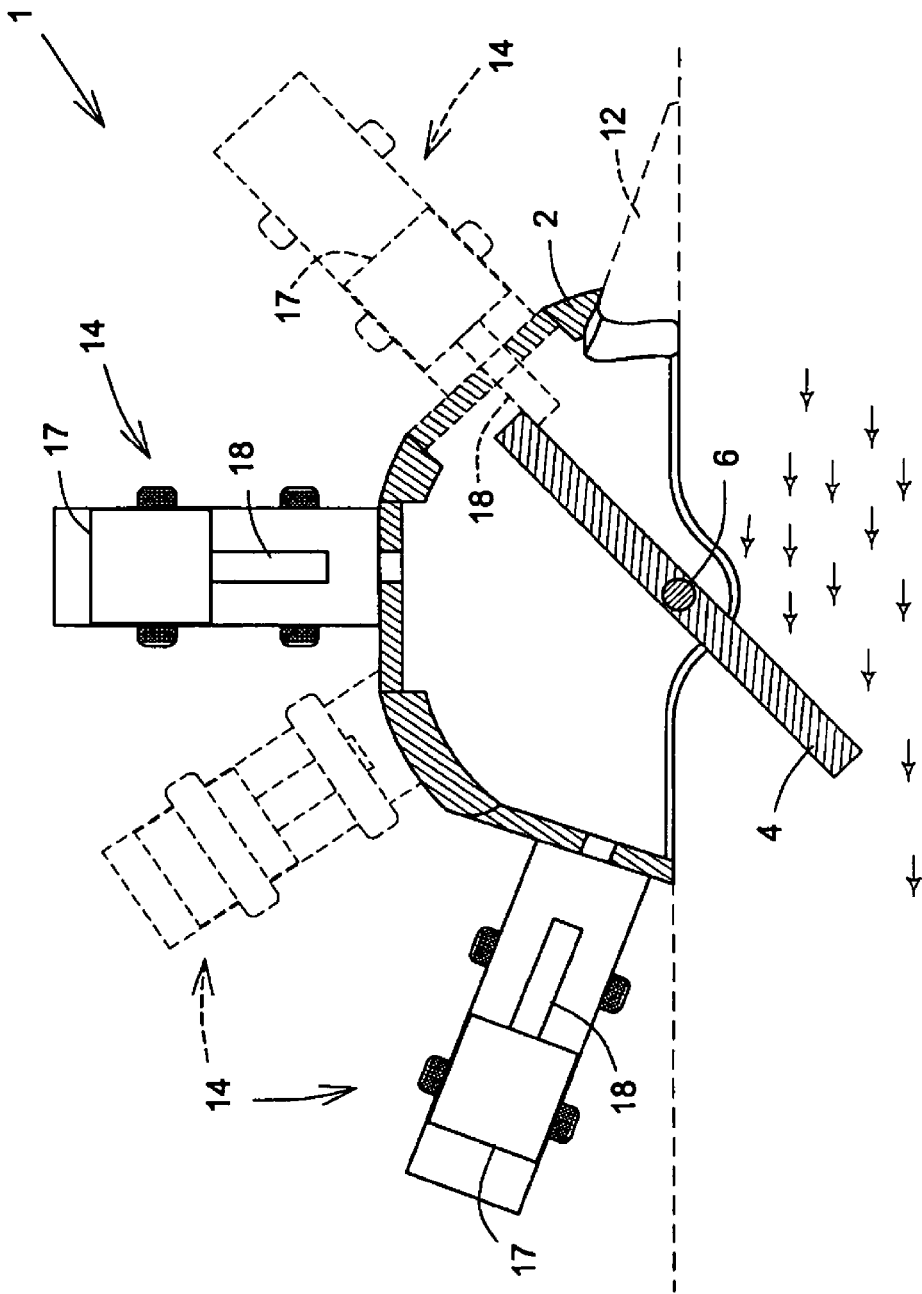
FIG. 3 Side sectional elevation of the flap device of FIG. 1 showing the flap in a second operational position, typically lift-off condition.

As the drag forces increase during acceleration for lift-off and the first stop pin 18 having been withdrawn by the electro-magnet 16, the air flow causes the flap 4 to rotate clockwise as viewed in FIGS. 1, 2, 3 and 4 and with the second stop pin 18 only shown in dotted lines in FIG. 3 for clarity purposes activated by its electro-magnet 16 to extend into the housing 2, abutment of the flap with the pin 18 occurs, as shown in FIG. 3 with the pin being in front of the flap, in which the flap 4 assumes a typical position for maximum lift, providing as little drag as possible during lift-off of the aircraft. After lift-off and during ascension, the flap 4 is allowed to return to the position shown in FIG. 2, still in the clockwise direction, by extracting back the first pin 18 and retracting the second pin, while using the damping mechanism 10 see hereinbelow.

Figure 4:
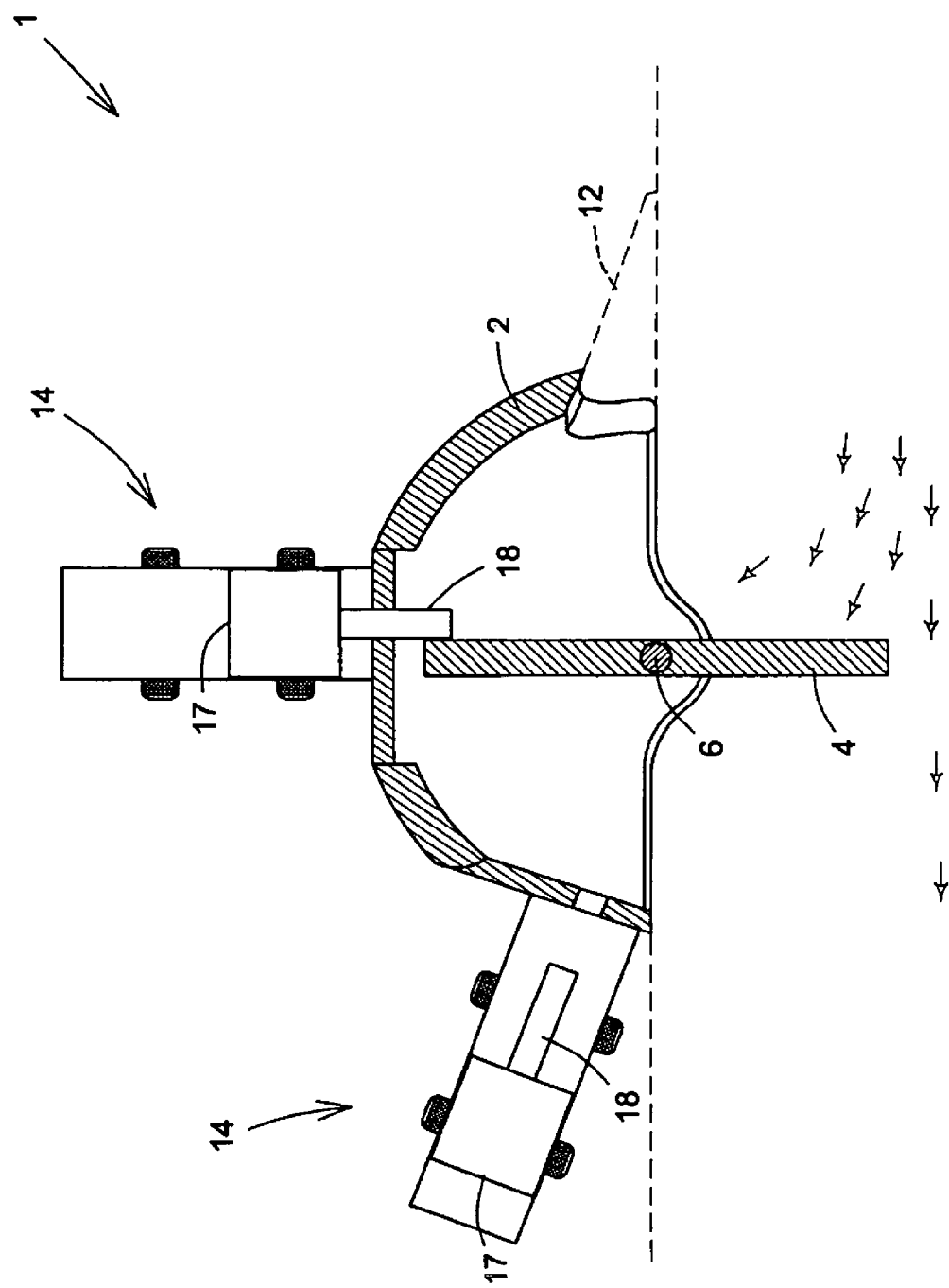
FIG. 4 Side sectional elevation of the flap device of FIG. 1 showing the flap in a third operation position, typically braking condition.

For descent during preparation for landing, the flap 4 is allowed to reach to pre-selected position, typically either in the lift-off position FIG. 3 or somewhere between the positions of FIGS. 3 and 4 in abutment with another pin not shown, in the same fashion as described hereinabove to reach the lift-off position. For braking just after landing, the retaining pin 18 holding the flap in the landing position is retracted to allow air flow to cause the flap 4 to rotate further clockwise from its landing position, past the nominal horizontal position, and with the third stop pin 18 activated by its electro-magnet 16 to extend into the housing 2, abutment of the flap with the pin 18 occurs, as shown in FIG. 4. The flap 4 then assumes a position in which the drag forces increase by virtue of the disposition of the flap 4 causing greater resistance to decelerate the aircraft.

The rate of rotation of the flap 4 on the shaft 6, as well as its direction of rotation, is controlled by the damping mechanism 10 to prevent undue impact with the pin 18 and also to give a smooth movement of the flap 4 rather than an instantaneous one. Accordingly the movement of flap 4 is damped. However, it should be realized that the damping mechanism 10 may be employed as an additional control to arrest the movement of the flap 4 into a position intermediate the stop member pins 18 should the performance characteristics dictate its usage in this manner. Similarly, the damping mechanism 10 could selectively operate in both directions, such as for example to allow damped rotation of the flap 4 in a first direction while preventing any rotation in the opposite direction, or vice-versa, whenever applicable.

The flap device is self-actuating in association with the air flow occasioned by the movement of the airfoil section. This factor alone is extremely beneficial in that it reduces the array of equipment usually present with hydraulically or electro-hydraulically operated flaps of conventional design and accordingly significantly reduces the running and maintenance costs of the aircraft whilst enhancing performance.

As has been indicated supra the present invention has application in fields other than the strictly aeronautical field with which it is primarily concerned, for interfacing with gaseous fluids. For example, the invention may be deployed in marine applications on vessels as a substitution for conventional steering gear interfacing with liquid fluids, thus again reducing the deployment of hydraulic equipment and the associated maintenance costs. The invention may also be used on the stabilizer systems on surface and sub-marine vessels. Further the invention may also be usable for space vehicles at least during launch as a means of steering control in the trajectory mode. The simplicity of the invention is of high value as is its efficacy during operation. The present invention thus provides an improvement over conventional flap systems.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A flap device adapted for location on or in a fluid interfacing surface comprising:
   a housing;
   a flap mounted for rotation at least partially within the housing;
   an entry in a leading portion of the housing;
   at least one stop member associated with the housing and actuable between a non-operative parked position and an operative position in which in use the member is adapted to limit the movement of the flap within the housing thereby to vary the coefficient of lift and drag of the fluid interfacing surface.

2. A flap device as in claim 1 wherein:
   the housing is hemispherical in form;
   the flap is of circular disc-like shape being pivotally mounted on a diametrical axis whereby the movement of the flap sweeps the void within the housing.

3. A flap device as in claim 1 wherein:
   at least one stop member having a pin operable electromagnetically to assume the non-operative parked position or the operative position whereby it extends into the housing to provide an arresting stop for the flap to limit its movement.

4. A flap device as in claim 1 wherein:
   additional stop members are disposed at other locations for additional flexibility of control of the flap.

5. A flap device as in claim 1 wherein:
   the flap is mounted on a shaft carried in suitable bearings or bushings in the housing, and a damping mechanism is provided to modulate the speed of rotation of the shaft and thus of the flap.

6. A flap device as in claim 1 wherein:
   the damping mechanism is being used to prevent rotation of the flap, on either direction, selectively, to act as a brake.

7. A flap device as in claim 1 wherein:
   at least one stop member having a pin operable electromagnetically to assume the non-operative parked position or the operative position whereby it extends into the housing to provide an arresting stop for the flap to limit its movement.

8. A flap device as in claim 1 wherein:
   additional stop members are disposed at other locations for additional flexibility of control of the flap.

9. A flap device as in claim 1 wherein:
   the flap is mounted on a shaft carried in suitable bearings or bushings in the housing, and a damping mechanism is provided to modulate the speed of rotation of the shaft and thus of the flap.

10. A flap device as in claim 8 wherein:
    the damping mechanism is being used to prevent rotation of the flap, on either direction, selectively, to act as a brake.

11. A flap device as in claim 1 having a method of use consisting in the steps of:
    the extension of the stop member maintains the flap in an orientation to control the lift or drag coefficient of the airfoil section;
    two or more stop members are provided at different location about the housing, one stop member to provide for maximum lift;
    another stop member to provide for maximum drag for take-off and landing.

12. A flap device adapted for location on or in a fluid interfacing surface comprising:
    a housing;
    a flap mounted for rotation at least partially within the housing;
    an entry in a leading portion of the housing;
    at least one stop member associated with the housing and actuable between a non-operative parked position and an operative position in which in use the member is adapted to limit the movement of the flap within the housing thereby to vary the coefficient of lift and drag of the fluid interfacing surface;
    the housing is hemicylindrical and the flap is rectilinear being pivotally mounted along an axis thereof, the flap sweeping the void within the housing.

13. A flap device as in claim 12 wherein:
    at least one stop member having a pin operable electromagnetically to assume the non-operative parked position or the operative position whereby it extends into the housing to provide an arresting stop for the flap to limit its movement.

14. A flap device as in claim 12 wherein:
    additional stop members are disposed at other locations for additional flexibility of control of the flap.

15. A flap device as in claim 12 wherein:
    the flap is mounted on a shaft carried in suitable bearings or bushings in the housing, and a damping mechanism is provided to modulate the speed of rotation of the shaft and thus of the flap.

16. A flap device as in claim 12 wherein:
    the damping mechanism is being used to prevent rotation of the flap, on either direction, selectively, to act as a brake.

* * * * *